United States Patent [19]

Ema et al.

[11] Patent Number: 4,603,087

[45] Date of Patent: Jul. 29, 1986

[54] FIXING ROLL

[75] Inventors: Hideaki Ema, Shizuoka; Yasuo Hirano; Kazuo Nojima, both of Numazu, all of Japan

[73] Assignee: Ricoh Co., Ltd., Tokyo, Japan

[21] Appl. No.: 670,180

[22] Filed: Nov. 9, 1984

[30] Foreign Application Priority Data

Nov. 12, 1983 [JP] Japan ................................ 58-213134

[51] Int. Cl.$^4$ ................................ C08K 3/36

[52] U.S. Cl. ................................ 428/447; 428/36; 29/132; 524/588

[58] Field of Search ................................ 428/36, 447; 29/132, 29/130

[56] References Cited

U.S. PATENT DOCUMENTS

| | | | |
|---|---|---|---|
| 3,988,817 | 11/1976 | Thettu | 29/130 |
| 4,074,001 | 2/1978 | Imai et al. | 29/132 |
| 4,188,423 | 2/1980 | Swift | 29/132 |
| 4,280,263 | 7/1981 | Dean et al. | 29/132 |
| 4,313,981 | 2/1982 | Namiki | 29/130 |
| 4,357,388 | 11/1982 | Minor | 428/447 |
| 4,360,566 | 11/1982 | Shimizu et al. | 29/132 |

FOREIGN PATENT DOCUMENTS

| | | |
|---|---|---|
| 1458694 | 12/1976 | United Kingdom . |
| 1503704 | 3/1978 | United Kingdom . |
| 1502450 | 3/1978 | United Kingdom . |

OTHER PUBLICATIONS

"Polymer Chemistry of Synthetic Elastomers", Part II, Interscience Publishers (New York), title page and pp. 794 through 803.

Kirk-Othmer's "Encyclopedia of Chemical Technology", Third Edition, vol. 20, Wiley-Interscience (New York), title page and pp. 948 through 953.

"Principles of Polymerization", Second Edition, George Odian, Wiley-Interscience (New York), title page and pp. 669 through 671.

"Nihon Rubber Society", vol. 46, No. 4, pp. 301 and 302 (1973), including English Translation of Marked Portion.

*Primary Examiner*—Lewis T. Jacobs

*Attorney, Agent, or Firm*—Flynn, Thiel, Boutell & Tanis

[57] ABSTRACT

A fixing roll which comprises crosslinking a rubber compound containing a methyl vinyl system silicone raw rubber and silica so as to have a crosslinking density of $6\times10^{-4}$ mole/cc and forming a coated layer.

6 Claims, 4 Drawing Figures

FIXING ROLL

BACKGROUND OF THE INVENTION (a) Field of the invention

The present invention relates to a fixing roll consisting essentially of silicone rubber for use in an electrostatic photography process and the like.

(b) Description of the prior art

In the electrostatic photography processes such as electrophotography and the like, an image can generally be obtained by the steps of forming a toner image on an image supporting means such as paper or the like by virtue of transfer or development and fixing this toner on said image supporting means by heating or pressure. As this fixing means, there has been used a fixing silicone rubber roll. However, the usual fixing roll is limited in durability, for instance about 60000 about 80000 pieces when actually set in an electrophotographic copying machine. In view of this, development of a fixing roll which is more superior in durability has been expected.

SUMMARY OF THE INVENTION

The primary object of the present invention is to provide a fixing roll improved greatly in durability. The secondary object of the present invention is to provide a fixing roll usable in both press-fixing system and heat-fixing system, and further usable in a fixing means using these two systems at the same time.

The fixing roll according to the present invention is characterized in that its surface is crosslinked with a rubber compound containing methyl vinyl system silicone raw rubber and silica, and a coated layer having a crosslinking density of $6\times10^{-4}$ mole/cc or more is formed.

The methyl vinyl system silicone raw rubber has the polysiloxane structure represented by

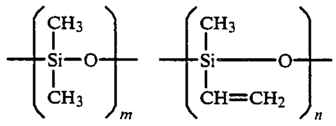

wherein the crosslinking density can be controlled by changing the ratio of m to n, namely by changing the percentage of vinyl group. Further, crosslinkage can be formed between silica and siloxane polymer.

Accordingly, the "crosslinking density" referred to in the present invention, unless defined specifically, includes both the crosslinkage formed by the vinyl group mentioned above and the crosslinkage formed between silica and the polymer. In other words, the crosslinking density denotes the number of crosslinkage contained per 1 cc of a crosslinked silicone rubber. This crosslinking density is measured by the toluene swelling method referred to afterwards.

In this connection, it is to be noted that the "methyl vinyl system silicone raw rubber" referred to above and afterwards means a silicone raw rubber having a methyl group and a vinyl group.

DETAILED DESCRIPTION OF THE PREFERRED EMBODIMENTS

Figure 1:
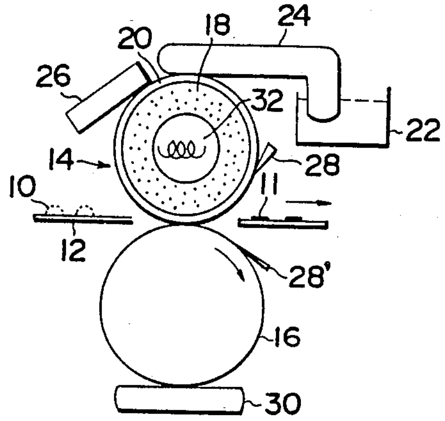
FIG. 1 is a schematic view showing the constitutional example of the fixing apparatus using the fixing roll according to the present invention.

The fixing roll according to the present invention is designed to achieve a powerful durability by raising the above mentioned crosslinking density to $6\times10^{-4}$ mole/cc or more, and especially this effect is conspicuous in the fixing roll used in the manner of supplying a polysiloxane system oil onto the roll surface as a mold release agent. The "polysiloxane system oil" referred to herein and afterwards means an oil containing a siloxane bond in the compound.

Silicone oil is supplied continuously onto the roll surface as a mold release agent in order to prevent the occurrence of toner offset, but the inventors of this application have found that the swelling property of rubber to this oil constitutes the powerful reason for deteriorating a rubber roll.

That is, the rubber swelled by the oil deteriorates in mechanical strength and weakens against the external force. At the same time, the impregnated oil itself creates an internal stress in the rubber to thereby accelerate deterioration. Still further, the oil acts as the carrier for conveying a deterioration-promoting substance into an image supporting means such as toner, paper or the like.

The usual rubber roll is severely deteriorated in durability because its initial degree of swelling is large and further the increasing percentage of the degree of swelling becomes large as the rubber roll is used.

In contrast, the present invention can suppress the degree of swelling of the polysiloxane system oil by raising the crosslinking density of silicone rubber to $6\times10^{-4}$ mole/cc or more. The crosslinking density preferably is in the range of $6\times10^{-4}$–$10\times10^{-4}$ mole/cc, more preferably in the range of $6\times10^{-4}$–$8\times10^{-4}$ mole/cc taking the processability of silicone rubber and the like into consideration.

The crosslinking density of silicone rubber can be controlled by regulating the contents of the vinyl group in the methyl vinyl system silicone raw rubber, the compounding amount of silica in the rubber compound or the surface activity of silica.

In this connection, it is to be noted that when the crosslinking density derived from the vinyl group alone is increased, the deterioration of rubber in the presence of the polysiloxane system oil can be more prevented, but when the crosslinking density is set to be $6\times10^{-4}$ mole/cc or more by virtue of the vinyl group alone without using silica, the tensile strength lowers and the abrasion resistance deteriorates, whereby the durability gets worse.

Silica may be either wet silica (precipitated silica) or dry silica (aerosol silica). However, the wet silica is more preferable in the point of mold releasing property against the toner. In this instance, the concurrent use of wet silica and dry silica may be considered as occasion demands. The compounding amount of silica in the rubber compound may be adjusted properly in the range where the crosslinking density of a crosslinked silicone rubber is $6\times10^{-4}$ mole/cc or more and preferably is in the range of 30–60 wt. %. When the compounding amount of silica in the rubber compound is less than 30 wt. %, there is a tendency to result in an increased content of the vinyl group and a lowered tensile strength and abrasion resistance, while when said compounding amount is over 60 wt. %, there is a peril that the mold releasing property against toner is lowered and this brings about toner offset when actually employed in a copying machine or the like.

The rubber compound according to the present invention may contain another inorganic filler besides silica, a crosslinking agent, a heat stabilizing agent, a processing aid and the like.

As the inorganic filler, there can be used powders of diatom earth, quartz, iron oxide, zinc oxide, titanium oxide, calcium oxide, magnesium oxide, talc, aluminum silicate, aluminum oxide and the like; fibers of carbon black, potassium titanate, asbestos, glass, carbon and the like; and powders of Teflon, boron nitride and the like. Among them, the diatom earth is most preferable. These fillers exert little influence upon the crosslinking density and can control the degree of hardness of silicone rubber or the degree of swelling of oil.

As the crosslinking agent, there can be used peroxides and the like. As the preferable crosslinking agent, there can be enumerated 2,5-dimethyl-2,5di(tertiary butyl peroxy) hexane and dicumyl peroxide.

The fixing roll according to the present invention can be actually prepared in the manner of using the rubber compound containing the methyl vinyl system silicone raw rubber and silica, crosslinking this and forming the coated layer of silicone rubber on the core bar of said roll.

In FIG. 1, an image supporting means 12 such as paper or the like on which an image is formed using a toner 10 passes through between a fixing roll 14 and a pressure roll 16, and said toner 10 is heated by said fixing roll 14 and fixed on said image supporting means 12, whereby an image 11 is formed. A silicone rubber layer 20 whose crosslinking density is $6\times10^{-4}$ mole/cc or more is formed on the core bar 18 of the fixing roll 14. A mold release agent is conveyed from a mold release agent tank 22 onto the surface of the fixing roll 14 by means of a mold release agent-coated felt 24, and the coated amount is controlled by a blade 26. Reference numerals 28, 28' each denotes a separating blade, 30 denotes a cleaning material and 32 denotes a heater.

As described above, the fixing roll according to the present invention is characterized in that the silicone rubber which contains silica and is high in crosslinking density is used as the coated layer. Because of this, the fixing roll according to the present invention can maintain the initial characteristic during its long-term use, is durable against abrasion and cracking, has a superior durability, and does not deteriorate even when used in the presence of the polysiloxane system oil.

As already stated, the fixing roll according to the present invention is suitably used as a fixing roll (A) or a pressure roll (B) for heat fixing, and further as a fixing roll (C) or a pressure roll (D) for pressure fixing and the like.

With reference to the above mentioned four rolls (A), (B), (C) and (D), the thickness and hardness of the coating layer are enumerated as shown in Table-1.

TABLE-1

| | Thickness (mm) | Hardness (According to JIS K-6310) |
|---|---|---|
| (A) | 0.1-1 | 60-90 |
| | preferably 0.3-0.5 | preferably 70-85 |
| (B) | 3-10 | 60-75 |
| | preferably 3-5 | preferably 60-65 |
| (C) | 0.1-1 | 60-90 |
| | preferably 0.3-0.5 | preferably 70-85 |
| (D) | 0.1-1 | 60-90 |
| | preferably 0.3-0.5 | preferably 70-85 |

EXAMPLES

EXAMPLE 1

A fixing roll was prepared by adding a crosslinking agent [RC-4 produced by TORE SILICONE K.K. which is consisted essentially of 2,5-dimethyl-2,5-di(tertiary butyl peroxy) hexane] and rouge to a rubber compound which comprises adding wet silica to three kinds of methyl vinyl system silicone rubbers being different in the contents of vinyl group in the amount of 1 wt. part per 100 wt. parts of the above mentioned compound respectively and forming a silicone rubber layer on an aluminum core rod by means of a press using a metal mold under the undermentioned conditions. This roll was actually set in the fixing means of a copying machine shown in FIG. 1 to thereby measure the number of durably copied sheets.

Pressure; 200 $Kg/cm^2$

Pressing temperature; 170° C.

Pressing time; 10 minutes

Secondary vulcanizing temperature; 200° C.

Secondary vulcanizing time; 4 hours

Figure 2:
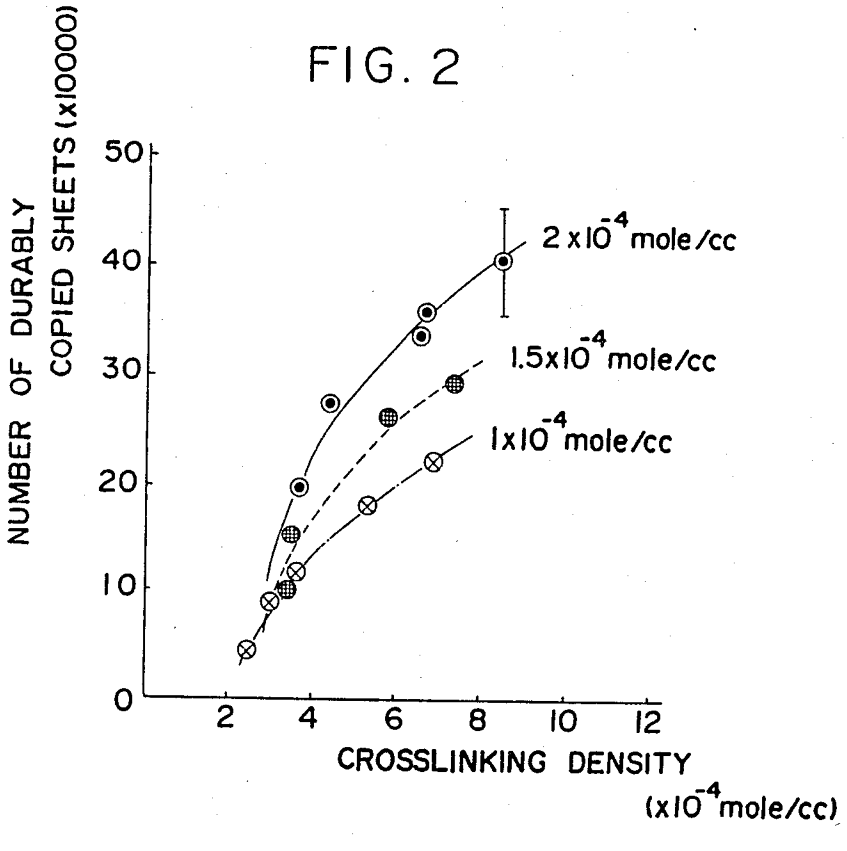
FIG. 2 and FIG. 3 are each a graph showing the relation between the crosslinking density and the number of durably copied sheets.

In this instance, the above mentioned three kinds of raw rubbers were vulcanized according to the same conditions except that the wet silica was not added to thereby find out the crosslinking density derived from a vinyl group. This value was employed as parameter. The crosslinking density of silicone rubber was changed by changing the amount of wet silica added respectively. Thus, the relation between the crosslinking density and the durably copied sheets was obtained. The obtained results are as shown in FIG. 2. Hereupon, the crosslinking density was measured by means of the toluene swelling method. And, the number of durably copied sheets was determined by the following method for valuing the durability. It can be seen from FIG. 2 that a superior durability can be obtained by setting up the crosslinking density to be $6\times10^{-4}$ mole/cc or more. When the crosslinking density derived from the vinyl group is increased, the durability is elevated. When the crosslinking density is $2\times10^{-4}$ mole/cc or more, the durability of 300000 sheets or more can be obtained.

The expression "$\times$10000" shown on the ordinate in FIG. 2 means that the calibration on the ordinate are multiplied by 10000. This holds true in the case of FIG. 3 referred to afterwards.

Measurement of the crosslinking density by means of the toluene swelling method

The crosslinking density was measured by the method disclosed in R. B. PRIME, Thermochimica Acta 26 (1978), 166-174 and "Application and development of silicone rubber", Polymer Digest 8 (1980), P 59-60.

That is, a sample of 5 mm$\times$20 mm was cut off from a 2 mm-thick vulcanization molded rubber sheet and dipped in a 50 ml of toluene at room temperature. And, the weight of the toluene-containing sample was measured every proper time. The weight of the sample, where the difference between two values measured at intervals of 24 hours became 1% or less of the weight of the sample, was named W(g).

Next, this sample was air-dried and thereafter was dried at 120° C. for 3 hours to remove toluene. Then, the weight Wo(g) was measured. This sample was placed on a platinum boat, heated to 900° C. at the heating speed of 10° C./minute or less in a current of nitrogen, held at 900° C. for 10 minutes, and thereafter cooled, whereby the weight Wf(g) of the remaining sample was measured.

The number of crosslinkage No/Vo (mole/cc) contained per 1 cc of the vulcanized rubber was found out using the above values by the following formula and made the crosslinking density.

$$No/Vo = \frac{-[\ln(1 - V_2) + V_2 + 0.465 V_2^2]}{106.27 \times (V_2^{166} - V_2/2)}$$

$$\text{wherein, } V_2 = \frac{\left(\frac{Wo - Wf}{Wo}\right)/0.98}{\left(\frac{Wo - Wf}{Wo}\right)/0.98 + \left(\frac{W + Wo}{Wo}\right)/0.867}$$

Method for valuing the durability

A roll, which comprises coating the surface of a hollow aluminum core rod having an outside diameter of 40 mm with silicone rubber so as to have a thickness of 0.5 mm, was employed as a fixing roll, and copying was carried out continuously by means of the apparatus shown in FIG. 1. A twill-figured image, wherein 8% of the total area of said image was black, was continuously formed on B4-sized papers by longitudinal feed (15 sheets/minute) by using polydimethylsiloxane as the mold release agent and under the conditions: the linear velocity of the fixing roll 115 mm/second and the surface temperature of the fixing roll 180±3° C., and the time when at least one of the non-fixed portion caused by the fixing roll, offset and unbalanced luster of the solid area came into existence was made the limit of durability.

EXAMPLE 2

Figure 3:
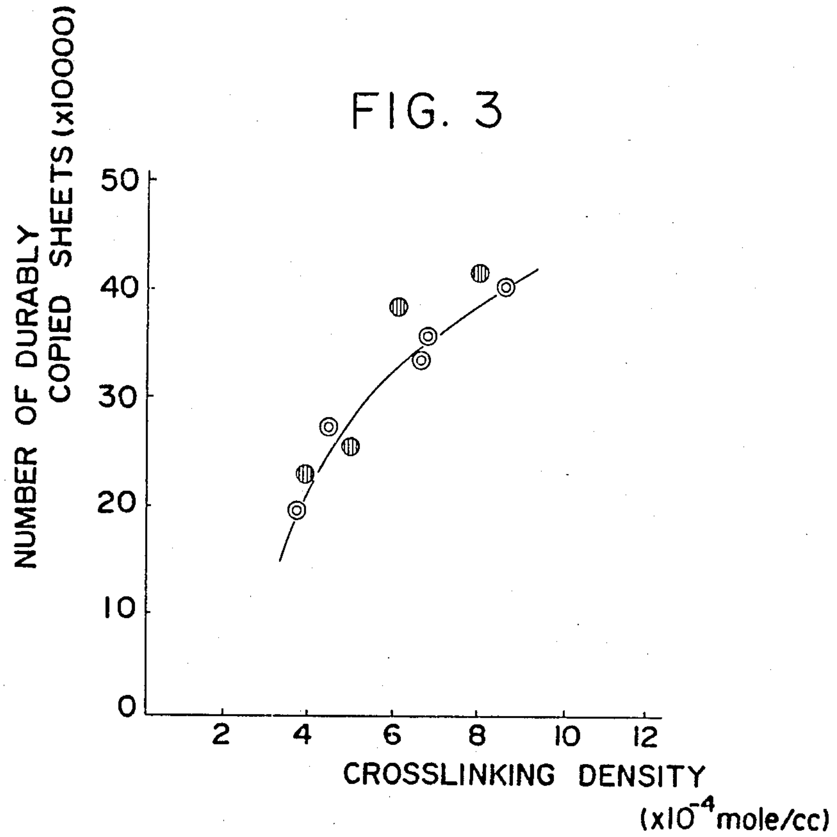

A fixing roll was prepared according to the same procedure as Example 1 except that a methyl vinyl system silicone raw rubber having the crosslinking density of $2\times10^{-4}$ mole/cc when vulcanized with a vinyl group alone was used and the crosslinking density was changed by adding a wet silica denoted by ◎ (Sipernat D-17 produced by Degusa AG Inc.) or a dry silica denoted by ⦶ (Aerosil R-972 produced by Nihon Aerosil K.K.) in various adding rates under the same vulcanizing conditions. The thus prepared fixing roll was evaluated for durability. The obtained results are shown in FIG. 3.

Figure 4:
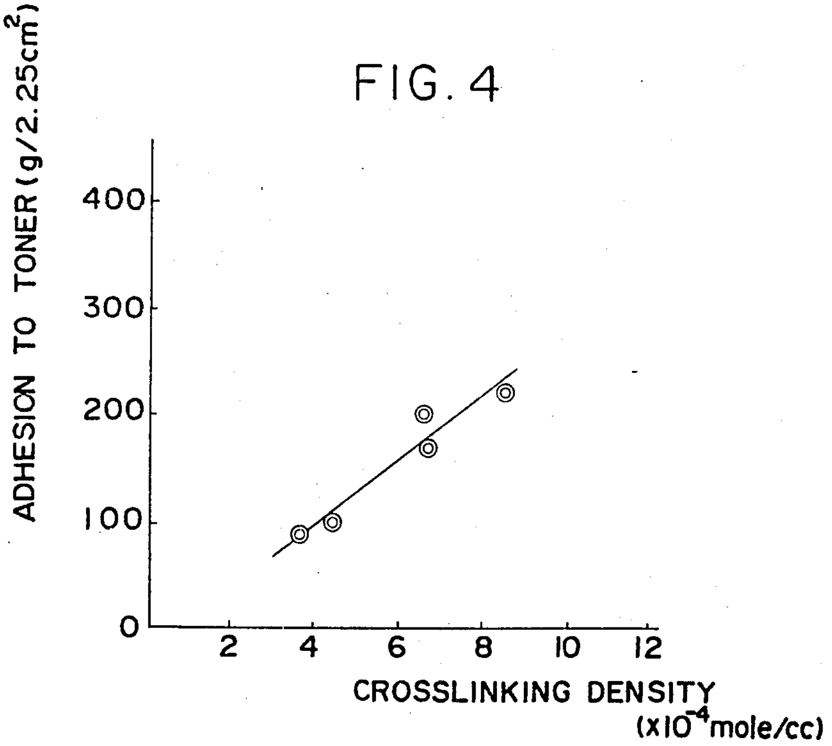
FIG. 4 is a graph showing the relation between the crosslinking density and the adhesion to the toner.

Further, rubber sheets having various crosslinking densities were prepared by using the same raw rubber and wet silica denoted by ◎ as mentioned above. The adhesive property of the sheet surface to the toner was evaluated, and the obtained results were shown in FIG. 4. A rubber sheet of 15 mm$^{\square}\times$2 mm$^{t}$ was put on a sheath heater. On the other hand, a paper was fixed on another sheath heater, and a toner comprising a molten, milled powder having the following composition was placed on said paper in an amount of $5\times10^{-3}$ g/cm$^2$. The surface temperature of the rubber sheet and the temperature of said toner were heated to 120° C. by means of the sheath heater respectively. Thereafter, the rubber sheet was thrust on the toner surface for 2 minutes under the pressure of about 3 Kg/15 mm×15 mm. In succession, the rubber sheet was separated apart at the speed of 40 mm/minute. The upper limit of the power exerted between the rubber sheet and the toner was named the adhesion (g/2.25 cm$^2$) to the toner.

Toner Composition unsaturated polyester resin: 100 wt. parts
styrene-(n-butyl methacrylate) copolymer: 20 wt. parts
carbon black: 45 wt. parts As an aim to eliminate the uneasiness of causing toner offset or coiling of copying papers round the fixing roll when the original of a black solid image is copied, it is preferable that the adhesion to the toner is 250 g/2.25 cm$^2$ or less. It can be seen from FIG. 4 that the adhesion of the fixing roll according to the present invention to the toner is sufficiently low.

EXAMPLE 3 methyl vinyl system silicone raw rubber (the same one as used in Example 2): 50 wt. %
wet silica (Sipernat D-17 produced by Degusa AG Inc.): 35 wt. %
diatom earth (Radiolite #200 produced by Showa Kogaku Kogyo K.K.): 15 wt. %

100 wt. parts of a rubber compound comprising the above mentioned composition was added with 1 wt. part of a crosslinking agent (RC-4 produced by Tore Silicone K.K.) and 1 wt. part of rouge. This mixture was valued in durability. The crosslinking density of this rubber material after vulcanization was $8.3\times10^{-4}$ mole/cc and the adhesion of this rubber material to the toner was 240 g/2.25 cm$^2$. The average number of durably copied sheets was 400000 sheets (the number of samples: 3).

What is claimed is:

1. In a fixing roll for electrophotography comprising a metal core and a silicone rubber surface layer, the improvement which comprises:

said silicon rubber surface layer is a heat-cured, crosslinked, silicone rubber composition having a crosslinking density of at least $6\times10^{-4}$ mole/cc measured by the toluene swelling method, said silicone rubber composition having been prepared by incorporating a peroxide crosslinking agent into a blend consisting essentially of silica and a polysiloxane polymer consisting essentially of recuring units of the formulas

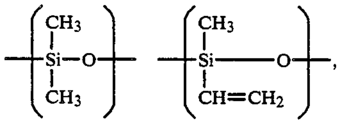

and heating said blend to a crosslinking temperature effective to convert said blend to said heat-cured, crosslinked, silicone rubber composition.

2. A fixing roll as claimed in claim 1 in which said polysiloxane polymer, when free of silica, is capable of having a crosslinking density, measured by the toluene swelling method, in the range of from $1\times10^{-4}$ to $2\times10^{-4}$ mole/cc.

3. A roll according to claim 1 wherein said crosslinking density is in the range of $6\times10^{-4}$–$10\times10^{-4}$ mole/cc.

4. A roll according to claim 1 wherein said crosslinking density is in the range of $6\times10^{-4}$–$8\times10^{-4}$ mole/cc.

5. A roll according to claim 1 wherein the amount of silica in said silicon rubber composition is in the range of 30–60 wt. %.

6. A roll according to claim 1 wherein said silica is either wet silica or dry silica.

* * * * *